(12) United States Patent
Jasnie et al.

(10) Patent No.: US 10,302,049 B2
(45) Date of Patent: May 28, 2019

(54) DUAL BELLOW FILTER ELEMENT WITH COMMUNICATION CHANNELS

(71) Applicant: MANN+HUMMEL PUROLATOR FILTERS LLC, Fayetteville, NC (US)

(72) Inventors: Jasris Jasnie, Fayetteville, NC (US); Michael Beauchamp, Fayetteville, NC (US)

(73) Assignee: MANN+HUMMEL Purolator Filters LLC, Fayetteville, NC (US)

( * ) Notice: Subject to any disclaimer, the term of this patent is extended or adjusted under 35 U.S.C. 154(b) by 33 days.

(21) Appl. No.: 15/383,712

(22) Filed: Dec. 19, 2016

(65) Prior Publication Data

US 2017/0234278 A1    Aug. 17, 2017

Related U.S. Application Data

(60) Provisional application No. 62/269,259, filed on Dec. 18, 2015.

(51) Int. Cl.
| | | |
|---|---|---|
| *B01D 46/00* | (2006.01) | |
| *B01D 46/12* | (2006.01) | |
| *B01D 46/52* | (2006.01) | |
| *F02M 35/024* | (2006.01) | |

(52) U.S. Cl.
CPC ..... *F02M 35/02433* (2013.01); *B01D 46/002* (2013.01); *B01D 46/12* (2013.01); *B01D 46/521* (2013.01); *F02M 35/0245* (2013.01); *F02M 35/02491* (2013.01); *B01D 2265/06* (2013.01); *B01D 2267/40* (2013.01); *B01D 2279/60* (2013.01)

(58) Field of Classification Search
CPC ............. B01D 46/0005; B01D 46/002; B01D 46/521; B01D 2256/06; B01D 2267/40; B01D 2279/60; F02M 35/02433; F02M 35/0245; F02M 35/02491
See application file for complete search history.

(56) References Cited

U.S. PATENT DOCUMENTS

| | | | | |
|---|---|---|---|---|
| 4,006,000 | A * | 2/1977 | Tortorici | B01D 46/0024 55/323 |
| 5,391,212 | A * | 2/1995 | Ernst | B01D 46/0005 123/198 E |
| 6,007,595 | A * | 12/1999 | Baik | B01D 46/0005 454/187 |
| 6,312,489 | B1 * | 11/2001 | Ernst | B01D 46/0005 55/385.3 |
| 7,662,216 | B1 * | 2/2010 | Terres | B01D 46/0005 55/482 |
| 8,211,197 | B2 | 7/2012 | Srinivasan et al. | |
| 8,241,382 | B2 | 8/2012 | Pham et al. | |
| 8,377,163 | B2 | 2/2013 | Srinivasan et al. | |
| 8,425,645 | B2 | 4/2013 | Pham et al. | |
| 8,734,556 | B2 | 5/2014 | Srinivasan et al. | |

(Continued)

*Primary Examiner* — Jason M Greene
(74) *Attorney, Agent, or Firm* — James Hasselbeck

(57) ABSTRACT

A filter assembly for a motor-vehicle air cleaner includes a primary filter, a secondary filter set apart from the primary filter, and a filter frame configured to support the primary filter and the secondary filter. The filter mount is fittable in and removable from a housing of the air cleaner, and includes a divider passing between the main filter and the auxiliary filter, the divider including at least two channels separated by a rib.

7 Claims, 3 Drawing Sheets

(56) References Cited

U.S. PATENT DOCUMENTS

| | | | |
|---|---|---|---|
| 2007/0144154 A1* | 6/2007 | Keller | F02M 35/024 |
| | | | 60/289 |
| 2014/0000228 A1* | 1/2014 | Enderich | B01D 46/002 |
| | | | 55/484 |
| 2016/0030869 A1* | 2/2016 | Fedak | B01D 46/002 |
| | | | 55/484 |
| 2016/0052371 A1* | 2/2016 | Allott | B01D 46/0005 |
| | | | 55/488 |
| 2016/0074794 A1* | 3/2016 | Sudermann | B01D 46/002 |
| | | | 55/484 |
| 2016/0220934 A1* | 8/2016 | Hasenfratz | B01D 46/002 |
| 2017/0197165 A1* | 7/2017 | Schwartz | B01D 46/002 |
| 2017/0361257 A1* | 12/2017 | Worrall | B01D 46/521 |

* cited by examiner

US 10,302,049 B2

DUAL BELLOW FILTER ELEMENT WITH COMMUNICATION CHANNELS

TECHNICAL FIELD

The present application relates to the field of motor vehicle engineering, and more particularly, to providing adequate air flow to a motor-vehicle engine system under conditions of heavy snow or dust.

BACKGROUND

U.S. Pat. No. 8,211,197, the entirety of which is incorporated-by-reference, describes an air cleaner filter assembly. The filter assembly includes a primary filter, a secondary filter set apart from the primary filter, and a frame fixed to and configured to support the main filter and the auxiliary filter. The frame is fittable in and removable from a housing of the air cleaner, and comprises a sealing element passing between the primary filter and the secondary filter.

During normal operation, air passes through only the primary filter and the secondary filter is sealed from the primary filter by the sealing element. When the primary filter is blocked by heavy dirt, dust, or snow, the secondary filter receives air flow and provides clean air to the vehicle engine. However in extreme conditions such as heavy mud, it is possible for pressure to cause the primary filter to collapse preventing air flow from the secondary filter.

SUMMARY

Accordingly, it is desirable to provide a filter assembly includes a primary filter, a secondary filter set apart from the primary filter, and a frame fixed to and configured to support the main filter and the auxiliary filter. The frame is fittable in and removable from a housing of the air cleaner, and the frame comprises a plurality channels, each channel is divided from an adjacent channel by at least one rib element of a plurality of rib elements. The plurality of rib elements prevents the frame from sealing between the primary filter and the secondary filter.

In one embodiment the primary filter is located apart from the secondary filter and wherein the primary filter is taller and longer than the secondary filter.

In one embodiment the primary filter and the secondary filter comprise a filter media that is pleated and the primary filter has more pleated media than the secondary filter.

In one embodiment the divider is configured to partially receive a wall of a filter housing. In this embodiment, the rib prevents the divider from sealing on the wall of the filter housing. The frame comprises a resilient material and the filter housing comprises a rigid material. Furthermore, the secondary filter is provided to clean intake air when the primary filter is clogged.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

DESCRIPTION

Figure 1:
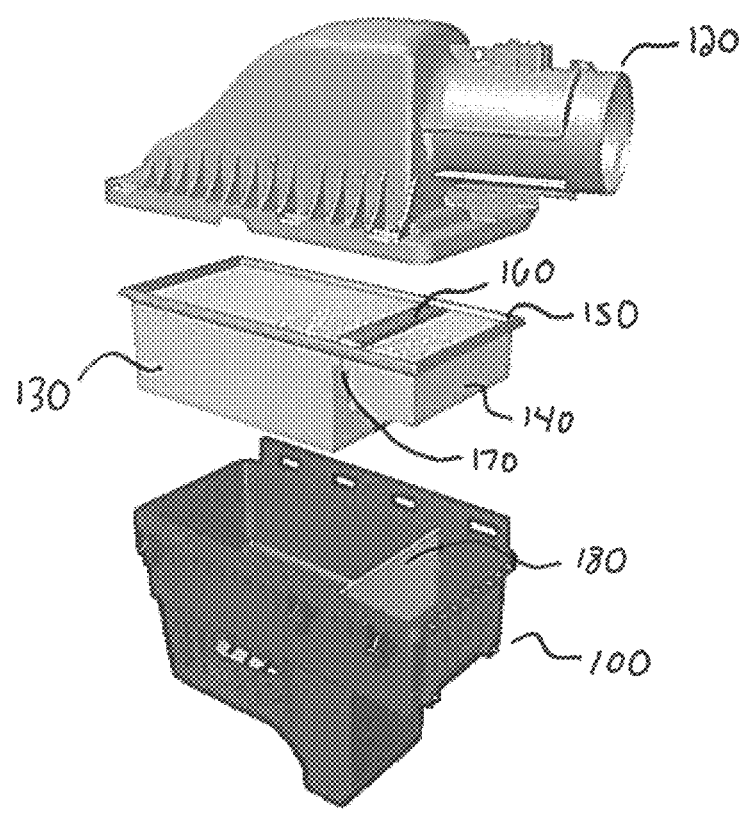
FIG. 1 depicts an assembly view of a air cleaner assembly, in which an air filter assembly having a primary and a secondary filter is secured into a frame, the air filter assembly is installed within a housing closed by a cover, forming the assembled air cleaner assembly.

FIG. 1 illustrates an air cleaner filter assembly. The air filter assembly includes a housing 100, a removable filter assembly 110, and a housing cover 120. The removable filter assembly 110 includes a primary filter 130, a secondary filter 140, and a filter frame 150. The filter frame has a divider 160 that separates the primary filter 130 from the secondary filter 140. The divider 160 includes two or more channels 170. The housing 100 includes a wall 180 that separates a primary chamber from a secondary chamber.

Both the primary filter 130 and the secondary filter 140 comprise a media material that is pleated to provide filtration of intake air. The primary filter 130 is longer and taller than the secondary filter 140. The primary filter 130 may also be wider than the secondary filter 140. The filter assembly is configured so that the secondary filter 140 cleans intake air when the primary filter 130 is clogged with debris, snow, or other material.

Figure 2:
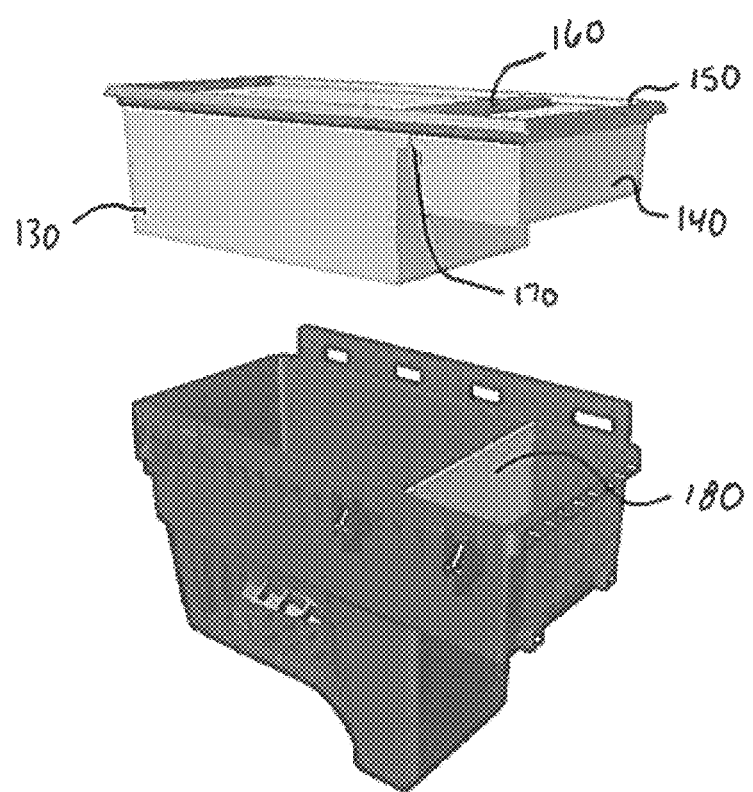
FIG. 2. depicts an enlarged view of the removable filter assembly and the housing, as shown in FIG. 1.

As shown in FIG. 2, the removable filter assembly 110 fits insides the housing 100, with the primary filter 130 in the primary chamber, the secondary filter in the secondary chamber, and the channels 170 fit generally on the wall 180.

Figure 3:
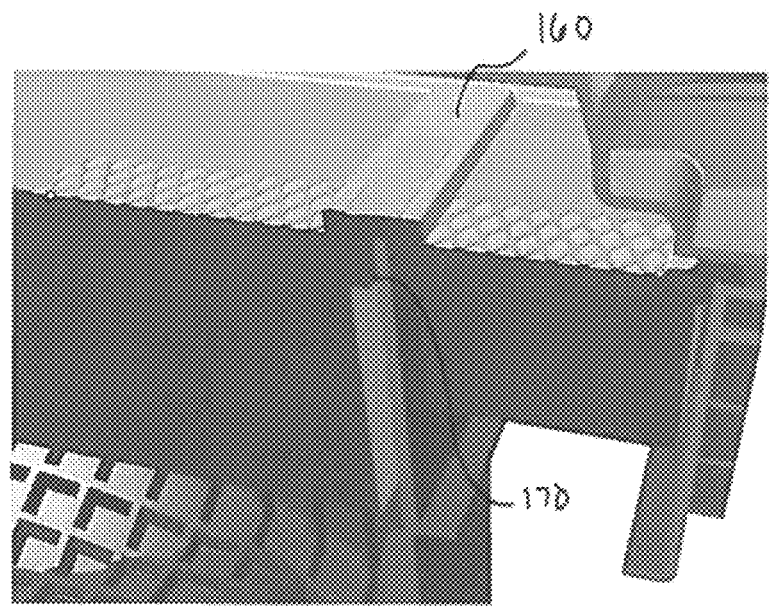
FIG. 3. shows a section view of the air filter assembly in which a frame of the divider is installed onto a divider wall of the housing, the divider of the air filter assembly having a U-shaped channel which is divided into connecting channels, to ensure leakage flow through the divider of the air filter assembly primary filter to the secondary filter, or the reverse thereof.
Figure 3A:
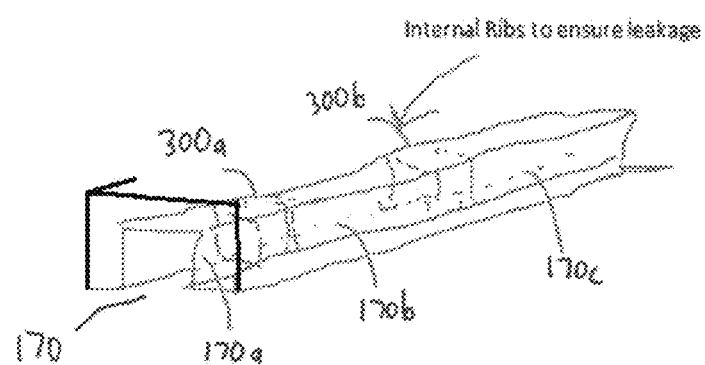
FIG. 3A shows an enlarged schematic view of only the walls forming the U-shaped channel of the divider of FIG. 3. The U-shaped channel of the divider into which the upper portion of the divider wall of the housing is received, the U-shaped channel divided into sub channels by one or more ribs formed in the U-shaped channel of the divider.

FIG. 3 and FIG. 3A illustrates an exploded view of the divider 160 and the U-shaped channel 170, forming a groove in the divider 160. The divider includes sub channels 170a, 170b, 170c that are separated by ribs 300a, 300b formed in the U-shaped channel 170. The ribs prevent the sub channels from fitting tightly on the wall 180. Without the ribs 300a, 300b, the channels would comprise a single channel that extends across a width of the removable filter assembly. This channel could seal against the wall 180, preventing air from flowing between the primary filter 130 and the secondary filter 140. Even in embodiments where the channel is too wide to always seal against the wall, in high pressure situations the channel will seal against the wall. However, the ribs prevent the channels from sealing against the wall in all conditions.

Although FIG. 3 shows two ribs 300a, 300b, and three sub channels 170a, 170b, 170c, more ribs may be provided forming more sub channels. In one embodiment, a single rib is provided and the divider includes two sub channels. The ribs may be "formed" in the U-shaped channel 170 by any suitable method. For example, in one embodiment the ribs are formed by cutting channels in the divider with the ribs left in place. In another embodiment, the filter frame is formed by molding and the ribs are formed during the molding process. In yet another embodiment, the divider has a single channel and ribs are placed into the single channel to create a plurality of sub channels.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A filter assembly for an air cleaner configured to provide clean intake air for a motor vehicle, comprising:
    a primary filter with pleats projecting outward;
    a secondary filter set apart from the primary filter; and
    a filter frame circumferentially surrounding the primary filter and the secondary filter, the filter frame configured to support the primary filter and the secondary filter in an interior of the filter frame,
    the filter frame fittable in and removable from a housing of the air cleaner, and comprising
    a divider extending across the interior of the filter frame from a first side of the filter frame to an opposite second side of the filter frame, the divider passing between the primary filter and the secondary filter, the divider including:
        a U-shaped channel forming a groove extending along the divider from a first end of the divider to a second end of the divider, the U-shaped channel configured to receive and contact a edge of a divider wall of a housing configured to receive the filter assembly;
        at least one rib formed in an interior of the U-shaped channel and dividing the U-shaped channel into at least two sub channels;
        wherein the at least one rib is configured to contact the edge of a wall of the housing to space the divider from the wall of a housing, thereby forming the at least two sub channels interconnecting the primary and secondary filters providing leakage flow through the at least two sub channels formed in the divider by the at least one rib.

2. The filter assembly according to claim 1, wherein the primary filter is located apart from the secondary filter and
wherein the primary filter is taller and longer than the secondary filter.

3. The filter assembly according to claim 1, wherein the primary filter and the secondary filter comprise
    a filter media that is pleated and
    the primary filter has more pleated media than the secondary filter.

4. The filter assembly according to claim 1, wherein the divider is configured to partially receive a wall of a filter housing.

5. The filter assembly according to claim 4, wherein the rib prevents the divider from sealing on the wall of the filter housing.

6. The filter assembly according to claim 4, wherein the frame comprises a resilient material and
the filter housing comprises a rigid material.

7. The filter assembly according to claim 4, wherein the secondary filter is provided to clean intake air when the primary filter is clogged.

* * * * *